United States Patent
Dalbiez (10) Patent No.: US 6,354,418 B1
(45) Date of Patent: Mar. 12, 2002

(54) CLUTCH MECHANISM, IN PARTICULAR FOR MOTOR VEHICLE

(75) Inventor: André Dalbiez, Argenteuil (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/402,994

(22) PCT Filed: Feb. 15, 1999

(86) PCT No.: PCT/FR99/00335

§ 371 Date: Aug. 29, 2000

§ 102(e) Date: Aug. 29, 2000

(87) PCT Pub. No.: WO99/41515

PCT Pub. Date: Aug. 19, 1999

(30) Foreign Application Priority Data

Feb. 13, 1998 (FR) .............................................. 98 01769

(51) Int. Cl.⁷ .............................................. F16D 13/58
(52) U.S. Cl. ................................ 192/70.13; 192/70.27; 192/89.24; 192/109 R; 192/DIG. 1
(58) Field of Search ........................... 192/70.13, 70.25, 192/70.27, 89.24, 109 R, DIG. 1

(56) References Cited

U.S. PATENT DOCUMENTS

| 4,609,086 A | * | 9/1986 | Vogel ........................ 192/70.27 |
| 4,660,695 A | * | 4/1987 | Fukatani ............... 192/70.13 X |
| 4,883,153 A | * | 11/1989 | Maucher et al. .......... 192/70.27 |
| 5,002,168 A | * | 3/1991 | Hrubesch .................. 192/70.27 |

FOREIGN PATENT DOCUMENTS

| DE | 4222045 A1 | 1/1994 |
| FR | 2558549 A1 | 7/1985 |
| FR | 2608704 A1 | 6/1988 |
| FR | 2739159 A1 | 3/1997 |
| GB | 2120329 A | 11/1983 |
| GB | 2263509 | 7/1993 |
| GB | 2296541 A | 7/1996 |

* cited by examiner

Primary Examiner—Richard M. Lorence
(74) Attorney, Agent, or Firm—Liniak, Berenato, Longacre & White (57) ABSTRACT

The invention concerns a clutch mechanism comprising a support part (8) bearing at its outer periphery fixing brackets (7) in contact with the inner surface of the stop brackets (5) of a cover (2), bearing pivotedly the clutch levers (42), some of which are in contact with the support part (8) inner periphery. The invention is applicable to motor vehicles.

14 Claims, 5 Drawing Sheets

CLUTCH MECHANISM, IN PARTICULAR FOR MOTOR VEHICLE

The present invention relates to friction clutches, especially for motor vehicles, and is more particularly directed to the unitary assembly which is incorporated in such a clutch, as described for example in the documents FR-A-2 242 892 and FR-A-2 420 690. Such a unitary assembly is called a clutch mechanism.

A clutch mechanism conventionally comprises a reaction plate which is part of an engine flywheel, which may be divided into two parts so as to constitute, in particular, a torsion damped flywheel.

The reaction plate is fixed in rotation to a first shaft, such as a driving shaft, namely the crankshaft of the internal combustion engine in the context of application to a motor vehicle.

This reaction plate has a dorsal friction face, and is fixed in rotation to a pressure plate which is able to be displaced axially with respect to the reaction plate, also referred to as the engine flywheel.

The pressure plate has a front friction face.

The friction liners of a friction disc are interposed between the pressure plate and the reaction plate, and more precisely between the friction faces of these latter.

These liners are fixed to a support which is usually axially deformable elastically. In another version, the support is rigid, being for example encapsulated at its outer periphery within a single friction liner. The said support, which may be double, is rigidly or elastically connected to a hub which is fixed in rotation to a second shaft, such as a driven shaft, namely the input shaft of a motion transmission means, for example a gearbox in the context of application to a motor vehicle.

When the friction liners are gripped between the pressure plate and reaction plate (clutch engaged), the torque is transmitted from the driving shaft to the driven shaft via the friction disc. When the friction liners are not gripped between the said plates (clutch disengaged), the driven shaft is not driven by the driving shaft. For this purpose, axially acting clutch engaging means are provided, and constitute a unit with declutching means which are arranged to counteract, when required, the action of the clutch engaging means bearing on a cover plate, so as to act on the pressure plate, and more precisely so as to act on engagement means carried by the pressure plate, which is fixed in rotation to the cover plate while being able to be displaced axially with respect to the latter, for example with the aid of a coupling using axially elastic tongues, or with the aid of a tenon and mortice type coupling, in which radial lugs, forming tenons, of the pressure plate are engaged for axial sliding movement in grooves, forming mortices, of the cover plate.

The cover plate has at its outer periphery fastening means for securing it to the reaction plate, either detachably or permanently.

The clutch engaging means include at least one Belleville ring, and the declutching means include declutching levers for acting on the clutch engaging means. Usually, these clutch engaging and declutching means are part of one common component, elastic in the axial direction, which is a so-called diaphragm. This diaphragm, which is of frusto-conical form in the free state, has a peripheral portion in the form of a Belleville ring, which is extended radially towards the centre by a central portion divided into radial fingers by blind slots with widened bases, to define widened apertures at the inner periphery of the Belleville ring that constitutes the axially acting clutch engagement means, while the radial fingers constitute declutching levers and therefore the declutching means of the clutch.

In the documents FR-A-2 242 892 and FR-A-2 420 690, the cover plate constitutes, with the pressure plate, the resilient tongues and the diaphragm, a unitary assembly or so-called clutch mechanism which is fixed on the reaction plate. This clutch mechanism may of course constitute, with the friction disc and the reaction plate, a module which is attached in a unitary manner on the crankshaft of the engine of the vehicle or on a radial plate fixed to the crankshaft, with the reaction plate then being secured on the radial plate, which is preferably flexible.

This mechanism may be equipped with a wear compensating device for the friction liners and the friction faces of the pressure plate and reaction plate, in order that the diaphragm can be in a substantially constant position when the clutch is engaged, over the working life of the friction clutch.

This wear compensating device usually comprises ramps and counter-ramps which act between the pressure plate and the engagement means of the diaphragm, or between the diaphragm and the cover plate. An initiator, which is sensitive to the state of wear in the friction liners, enables the ramps to be rotated in the event of wear in order that the diaphragm will always occupy the same position when the clutch is engaged under the action of the clutch engaging means (liners gripped).

The initiator may include an elastic wear sensor or a system having a ratchet wheel and a worm, incorporated in a cassette.

Other versions may be envisaged.

In the documents mentioned above, the cover plate has a base portion, oriented transversely and open in the centre, and including abutment lugs at its inner periphery.

It is on these transversely oriented abutment lugs that the fingers of the diaphragm bear when the clutch mechanism is no longer fixed on the reaction plate. This position is called the storage position. In this position the diaphragm is inclined by a large amount, and the pressure plate projects axially with respect to the free end of the cover plate.

The pressure plate is further away in the axial direction from the base portion of the cover plate than it is when the clutch is in its engaged condition. In that condition the diaphragm is generally flat.

As can be seen in the document FR-A-2 242 892, the abutment lugs are spaced apart circumferentially at regular intervals with the fastening lugs of the diaphragm, so as to mount the diaphragm for tilting movement between a primary abutment and a secondary abutment, these abutments being carried by the cover plate.

The abutment lugs are separated therefore in pairs by slots, in the middle of which the fastening lugs are located.

The primary abutment is formed by press-forming the cover plate, and the secondary abutment is defined by the fastening lugs extending through the widened apertures in the diaphragm. As can be seen in FIG. 2 of the document FR-A-2 420 690, the secondary abutment is of course carried, in another version, by a crown ring.

The abutment lugs may also be fastening lugs and may in particular carry rivets or small fastening posts, or any other means, as described in the document FR-A-2 420 690.

An object of the present invention is to make use of the abutment lugs in a simple and inexpensive way.

According to the invention, a mechanism of the type defined above is characterised in that a support member carries at its outer periphery locating lugs which project radially outwards, in that the support member is in contact with at least a plurality of the declutching levers, while the locating lugs are in contact with the face of the abutment lugs facing towards the declutching levers, so that the locating lugs and the support member are inserted axially between the declutching levers and the abutment lugs by a connection of the bayonet type.

Thanks to the invention, the locating lugs and the support member together constitute a locating means or spacer which is inserted axially, in one embodiment, between the diaphragm and the abutment lugs, so as to maintain the diaphragm in a predetermined position during assembly and/or disassembly of the clutch mechanism.

The support member, with its locating lugs, constitutes an assembly and/or dismantling tool for the clutch mechanism. It also acts as a tool for protection of, especially, the resilient tongues which couple the pressure plate in rotation with the cover plate.

In all cases, it is possible to avoid modifying the cover plate. The declutching levers can of course be part of a false diaphragm that includes an external peripheral portion in the form of an annular ring of low axial elasticity, or even without any axial elasticity, which is extended by a central portion divided into radial fingers by slots. The fingers constitute the declutching levers in the same way as the fingers of the diaphragm. The ring may be provided with blind radial slots which are open at the outer periphery of the ring, so that the latter will not be axially elastic, or will have only little axial elasticity. The false diaphragm is adapted to act on a Belleville ring constituting the clutch engaging means.

Thus in all cases declutching levers are provided which are mounted for pivoting or tilting movement by virtue of fastening means carried by the cover plate, and the support member with its locating lugs constitutes locating means which enables the clutch mechanism to be delivered in a position that corresponds to the clutch engaged position, that is to say in a position in which the pressure plate is retracted into the interior of the cover plate.

The clutch mechanism is then shorter in the axial direction, which facilitates its fitting on the reaction plate, the friction liners being, before it is mounted and fitted, interposed between the pressure plate and reaction plate.

In addition, the screws for fastening the cover plate to the reaction plate can be shorter and therefore less costly, because the pressure plate is retracted inside the cover plate. The female threads formed in the reaction plate for screwing in the fastening screws are also shorter, so that the strength of the reaction plate is increased.

These fastening screws may be replaced by rivets or other fastening members, shorter axially because of the invention.

The solution provided by the invention is therefore inexpensive and facilitates fastening of the cover plate, because the diaphragm is delivered in a position which corresponds to the clutch engaged position when the mechanism is fixed on the reaction plate.

Thus, the force which is exerted by the diaphragm is smaller than the maximum load which the latter can exert. During screwing or riveting of the cover plate in position on the reaction plate, and having regard to the interposition of the friction liners between the pressure and reaction plates, there is no need to displace the pressure plate from an initial position to a position corresponding to the maximum value of the force exerted by the diaphragm on the pressure plate, because the diaphragm is already beyond that position.

During this assembly operation, the friction disc is inserted between the pressure and reaction plates so that, having regard to the above mentioned position of the diaphragm, it only remains to compress the elastic support of the friction liners.

The fastening screws are then easily tightened. The same is true when the cover plate is fixed on the reaction plate, for example by seaming. The same is again true when the clutch engaging means consist of a Belleville ring.

This configuration is relevant in the case where the clutch mechanism is equipped with a wear compensating device, because the assembly leads to a configuration in which the clutch is in the engaged position appropriate for a new clutch (with unworn friction liners).

Because of the locating lugs according to the invention, the diaphragm can be slightly inclined, that is to say it can be put in a position for starting a declutching operation.

In that case there is no need during assembly to compress the support of the friction liners.

Fastening of the cover plate is even easier; the pressure plate can be stripped during assembly with respect to the friction liners.

It can therefore be seen that lugs according to the invention can be used for dismantling a module. In this connection it is possible to dismantle the reaction plate directly without having to dismantle the clutch mechanism.

Therefore, since the pressure plate has been stripped with respect to the friction liners, it is enough to put the holes formed in the friction disc and in the diaphragm into axial alignment with each other. The unscrewing tool is then passed through the said aligned holes so as to give access to the heads of the screws fastening the reaction plate to the crankshaft, and to unscrew the screws and dismantle the module. In another version, the mechanism is mounted on a double damped flywheel having radial springs and a small bearing fitted radially inward of the passage holes formed in the reaction plate, as described in the document FR-A-2 716 511.

The diaphragm may of course be inclined in the other direction.

In all cases, the wear compensating device, and especially the resilient member carried by the cassette of the latter or its elastic wear detecting member, is protected. In this connection, because of the support member having the locating lugs, the pressure plate can easily be finally fixed without damaging the wear compensating device.

The lugs according to the invention are therefore assembly and/or disassembly and/or protective lugs.

The circumferential width of the lugs according to the invention may be either smaller or greater than that of the abutment lugs.

The outer diameter of the locating lugs is preferably less than that of the internal diameter of the fastening lugs or fastening posts, or any other means for fastening the diaphragm carried by the abutment lugs.

In general terms, the locating lugs according to the invention are introduced into the slots that separate the abutment lugs in pairs, and then, by acting on the support member of the locating lugs, the diaphragm is deformed in the region of its inner end by an amount greater than the required position of the diaphragm, and finally the support member is rotated so as to bring the lugs of the invention under the abutment lugs.

After this rotation the force exerted on the support member is released, the latter being preferably in the form of a circular plate open in the centre, or in another version in the form of an open circular arch. The circumferential width of the locating lugs therefore depends on the circumferential width of the slot that exists between consecutive abutment lugs, in order that the abutment lugs can penetrate into the slots for the bayonet connection.

In order to rotate the abutment lugs, the support member is provided with apertures. These apertures, such as holes, also enable the tool or tools for screwing and unscrewing the screws fastening the reaction plate to the crankshaft of the engine to be inserted.

It can thus be seen that the cover plate is able to be fixed permanently to the reaction plate, for example by welding or seaming, so as to constitute a module with the friction disc.

The support member may of course be in the form of an annular ring with lugs at its inner periphery for rotating it.

Further advantages will appear on a reading of the description with reference to the attached drawings, in which.

The drawings show a clutch mechanism that constitutes a unitary assembly which is attached on a reaction plate, which may be of divided form so as to constitute a damped flywheel, with insertion of a friction disc between the reaction plate and the pressure plate which is part of the clutch mechanism.

In the context of application to a motor vehicle, the reaction plate is fixed to the crankshaft of the internal combustion engine, with which it is rotatable to form a driving shaft, while the friction disc has at its outer periphery friction liners which are fixed, for example by riveting, or by a connection having no fastening rivets, to a support plate, which may be double, and which is deformable elastically in the axial direction and coupled rigidly or elastically to a hub, the hub being rotatable with it and being, in this example, the input shaft of the gearbox that constitutes the driven shaft. It is the friction liners which are therefore arranged to be gripped releasably between the pressure plate and the reaction plate, so as to transmit the torque from the engine of the vehicle to the input shaft of the gearbox. For this purpose, axially acting clutch engaging means 4 are arranged to grip the friction liners between a friction face 11 which is formed on the front of the pressure plate 1, and a friction face formed on the back of the reaction plate, which may be carried by a flexible disc fixed to the crankshaft.

The clutch engaging means constitute a unit with disengaging means which are arranged to counteract, as required, the action of the clutch engaging means which engage, firstly on a cover plate 2, and secondly on engagement means 3 carried by the pressure plate 1, and more precisely by the back face of the latter.

The declutching means comprise declutching levers, on the inner ends of which there acts a clutch release bearing which is controlled manually, mechanically or hydraulically, or semi-automatically or automatically. The release bearing may be manoeuvred by an actuator with an electric motor governed according to predetermined programs by a computer receiving information, in particular regarding the speeds of rotation of the driving and driven shafts and the intention of the driver to change gear. The actuator may be connected hydraulically or mechanically to the clutch release bearing. Thus, the clutch release bearing may be part of a hydraulic receiver of the concentric type through which the input shaft of the gearbox passes, and which is connected to an hydraulic emitter manoeuvred either by the actuator or manually.

In the drawings the clutch engaging and disengaging means are part of a common member, a so-called diaphragm 4.

This diaphragm is frusto-conical in the free state and has a characteristic curve (force exerted as a function of its deflection) of sinusoidal form. Thus, going from the origin, the characteristic curve increases to a maximum and then decreases to a minimum before once again rising. When the clutch is engaged, the diaphragm occupies a position in the falling part of its characteristic curve, close to its maximum.

The same characteristic curve is obtained with a Belleville ring.

It will be recalled that the diaphragm 4 comprises an external peripheral portion in the form of a Belleville ring portion 41 which constitutes the clutch engaging means. This peripheral portion is extended radially towards the centre by a central portion which is divided into radial fingers 42 by blind slots 43.

The fingers 42 constitute declutching levers, while the slots 43 are open at their inner ends in the central aperture of the diaphragm 4, and at their outer periphery in widened apertures 44 which constitute the blind ends of the slots 43. These apertures 44 are rectangular in this example.

In the drawings, the clutch mechanism therefore comprises, as a unit, an assembly of annular components, namely a pressure plate 1, a cover plate 2, and a diaphragm 4 which bears axially, firstly on the cover plate 2, and secondly against the engagement means 3, so as to grip the friction liners between the friction faces of the pressure and reaction plates.

Like the reaction plate, the pressure plate 1 is made of a mouldable material and in this example it is a casting, and it is coupled in rotation to the cover plate 2 while being able to be displaced axially with respect to the latter, in this example by means of tongues 10 which are deformable elastically in the axial direction. The tongues are oriented tangentially here, being secured, in this case by riveting, to the cover plate at one of their ends, while at their other end they are fixed to the pressure plate 1, and more precisely, each tongue 10 is fixed to a lug 12 of the reaction plate 1, which is an axial outward projection.

In another version, the lugs 12, which are tenons, are engaged in axial grooves which are mortices in the cover plate 2.

The tongues 10 act as return means for the pressure plate. More precisely, the cover plate 2 has, firstly a base portion 21, which has a hole in its centre and which is oriented generally transversely, and secondly, means 22 for fastening the cover plate 2 to the reaction plate.

In the drawings the cover plate is in the form of a hollow dish, and has a radial end flange 22 which extends radially away from the axial axis of symmetry X-X of the clutch mechanism. This flange 22 is joined by an axially oriented annular skirt 23 to the base 21. The skirt 23 is of stepped diameter and is open at the level of tongues 10 which elastically return the pressure plate towards the base of the cover plate 2.

The flange 22 constitutes the fastening means and is divided into portions 27, 28 which are offset axially for fastening the tongues 10 and for fastening to the reaction plate. The portions 27 for fastening to the reaction plate have holes through which members for fastening it to the reaction plate pass, these being screws here. The diaphragm 4 bears at the outer periphery of its Belleville ring 41 on the engagement means 3, while the inner periphery of its Belleville ring 41 is mounted for tilting movement between two mutually facing abutments, which are respectively a secondary abutment 25 carried by fastening lugs 26.

The fastening lugs 26 are formed by stamping and bending to project from the inner periphery of the base 21 of the cover plate 2, which is a metal pressing here.

The lugs 22 are spaced apart circumferentially at regular intervals and are oriented axially.

The lugs 26 extend axially through widened holes 44 in the diaphragm 4, and beyond the diaphragm 4 they have a free end which is bent radially outwards, that is to say radially away from the axis of the assembly so as to define a locating bend for a frusto-conical crown ring 125 which has at its outer periphery a rounded edge 25 constituting the secondary abutment. The primary abutment 24 is in the form of an annular ring which in this example is formed by a press operation on the base 21 of the cover plate 2. In this example the ring 24 is of divided form.

In another version the ring 24 is applied on the cover plate 2. The inner periphery of the Belleville ring 41 of the diaphragm is interposed axially between the said abutments 24, 25 in facing relationship with each other. When the clutch is engaged, the diaphragm 4 is in engagement on the primary abutment 24 and on the engagement means 3 of the pressure plate.

By acting in thrust mode on the inner ends of the fingers 42 of the diaphragm 4 using a clutch release bearing (not shown), the diaphragm 4 is caused to tilt, which then engages on the secondary abutment 25 so as to cancel the load which it exerts on the pressure plate 1 via the engagement means 3; the tongues 10 bias the pressure plate towards the base 21 of the cover plate 2 so as to release the friction liners and disengage the clutch.

The secondary abutment may of course be discontinuous, being formed by the free ends of the fastening lugs 26, and being configured therefore as in the above mentioned document FR-A-2 242 892.

The fastening lugs 26 in this example are arranged in circumferential alternation with transversely oriented abutment lugs 5.

These abutment lugs project integrally from the base 21 of the cover plate and are press-formed, extending at the inner periphery of the base 21 of the cover plate 2, which therefore has a toothed internal form.

For more detail, reference should be made to the document FR-A-2 242 892, showing the fastening lugs 26 before they are bent and the abutment lugs 5 which are wider circumferentially than the fastening lugs 26.

The abutment lugs 5 in this example overlie a slot 43 which separates two consecutive fingers 42.

All of this does of course depend on the size of the cover plate. The abutment lugs 5 form an abutment for at least two fingers 42 constituting declutching levers. These abutment lugs 5 in the present case are trapezoidal in form. The inner diameter of the abutment lugs 5 is smaller than the inner diameter of the fastening lugs after bending. The lugs 5, 26 extend radially below the annular primary abutment 24. A slot 6 separates two consecutive abutment lugs 5. A fastening lug 26 is located in the middle of the slot 6 so as to penetrate axially into a widened aperture 44 of the diaphragm 4.

The inner periphery of the abutment lugs 5 is radially inward of the wide apertures 44. The fastening lugs 26 constitute fastening means for the tilting or pivoting mounting of the diaphragm 4 on the cover plate. In another version the fastening lugs can be omitted and the cover plate may have only the abutment lugs, as described in the document FR-A-2 420 690. In that case, the fastening lugs have holes for mounting of a comb-shaped annular member, or short posts with profiled heads constituting the secondary abutment, etc. All of the embodiments, such as also the clips, short posts carrying two engagement rings, etc., described in that document FR-A-2 420 690, to which reference can be made for more detail, may be envisaged. The abutment lugs 5, in the form of tongues, can therefore be fastening lugs. In a further version the ends of the fastening lugs 26 are cut off so as not to preserve the axial portion of the latter. The lugs 26 then constitute centring lugs and the abutment lugs 5 are fastening lugs as mentioned above. In yet another version, the cover plate only has abutment lugs, some of which constitute fastening lugs.

In a still further version, the fastening lugs 26 may carry a false diaphragm, that is to say a member the central part of which is divided into fingers like those of a diaphragm, while the annular peripheral portion has no elasticity or only a slight elasticity. For example, this annular peripheral portion, in the form of an annular ring, is provided with blind radial slots which are open radially at the outer periphery of the false diaphragm and of the ring-shaped annular portion.

The ring portion of the false diaphragm is therefore generally flat in the free state, as is the false diaphragm.

A Belleville ring then bears at its outer periphery on the cover plate and at its inner periphery on the peripheral ring portion of the false diaphragm. Such an embodiment is described in the document DE-A-4 326 501, to which reference can be made for more detail.

In the light of that document, it can of course be seen that the false diaphragm may be replaced by a plurality of individual declutching levers which are mounted for tilting or pivoting movement on the cover plate by means of fastening means carried by the cover plate, with two Belleville rings being interposed and being mounted in series so as to act as clutch engaging means.

Figure 1:
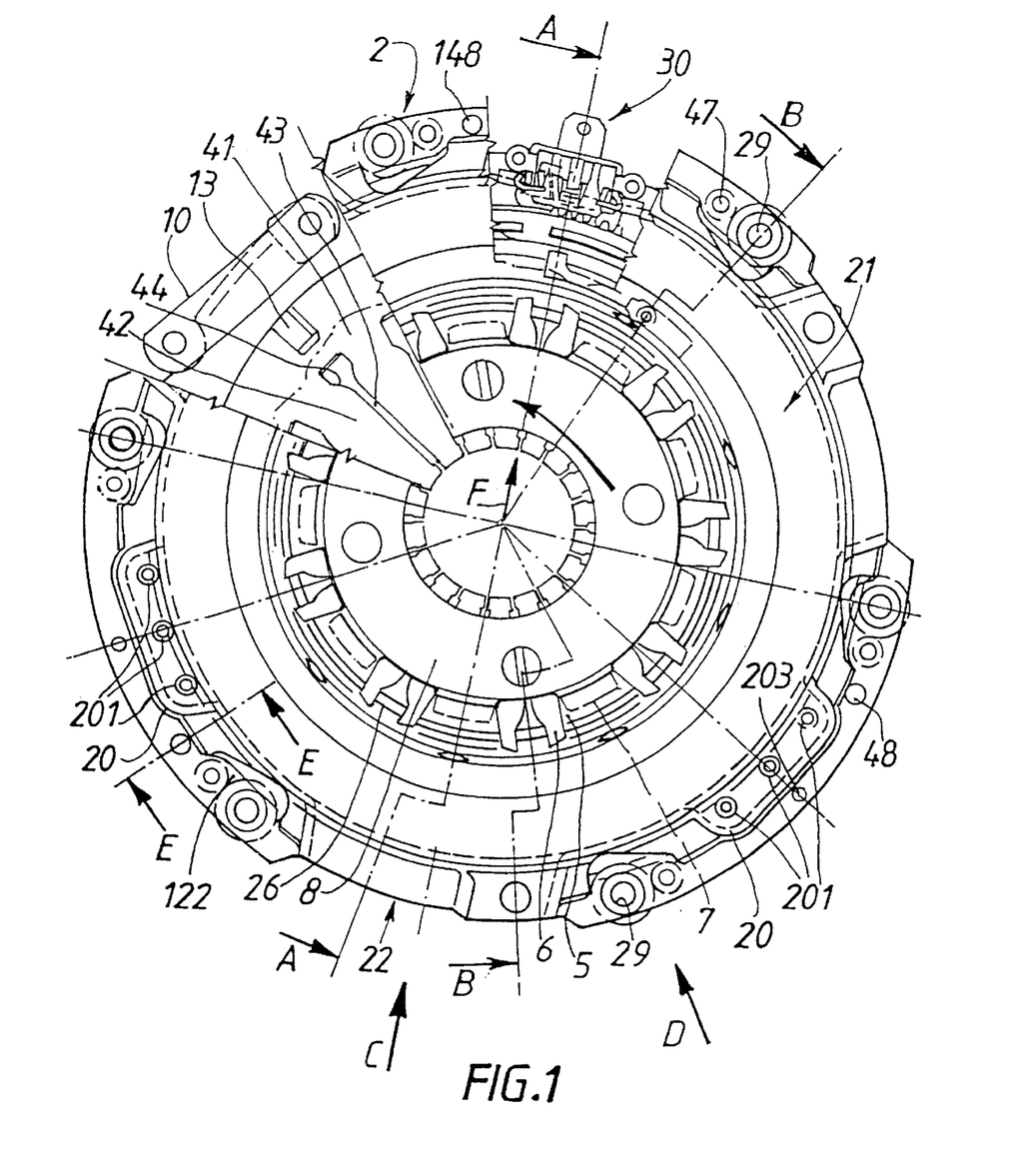
FIG. 1 is a front view of a clutch mechanism according to the invention, partly cut away so as to show the diaphragm, the tangential tongues, the ramp means and the cassette of the wear compensating device.
Figure 2:
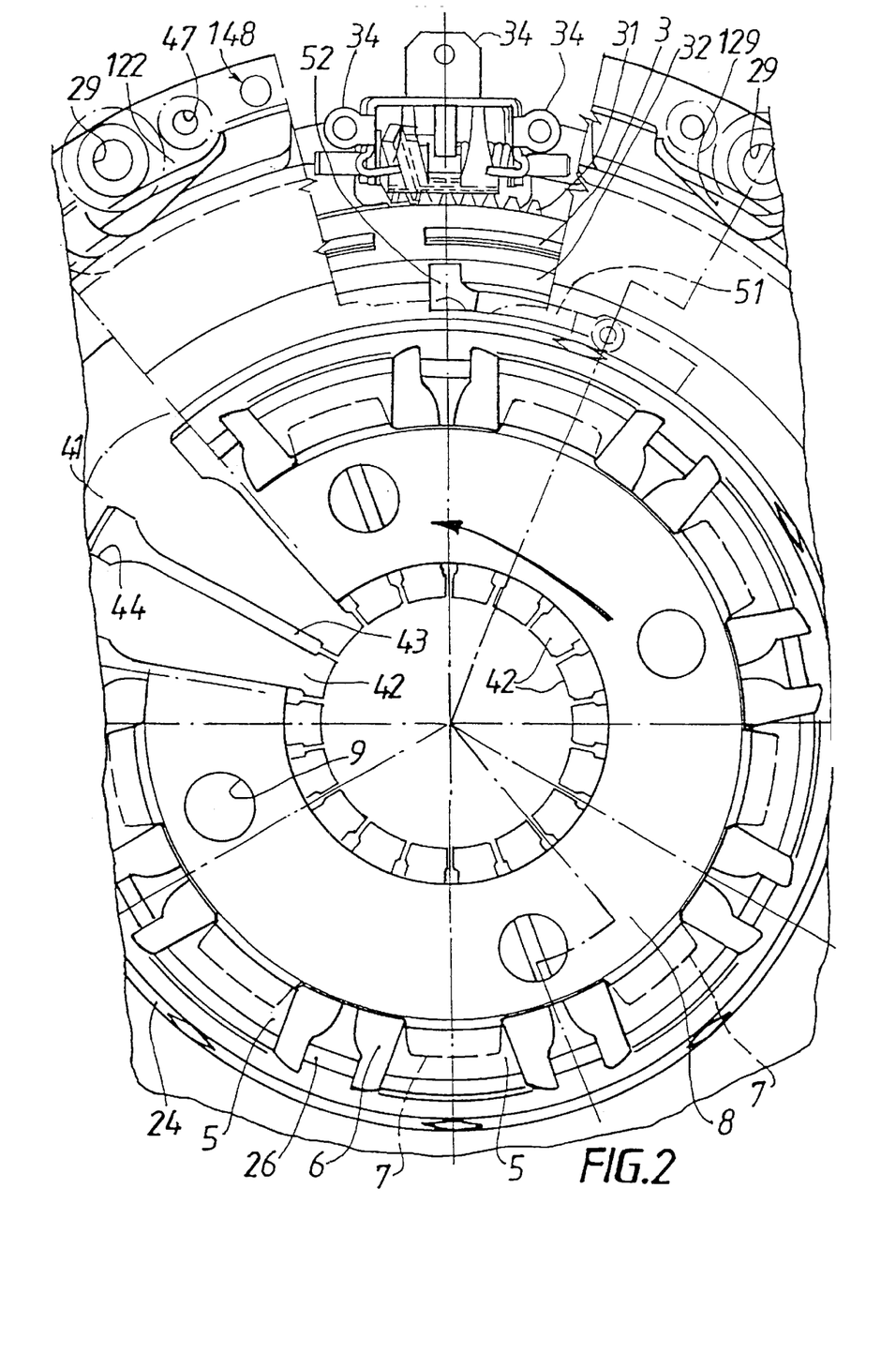
FIG. 2 is a view of the centre of FIG. 1 on a larger scale.
Figure 3:
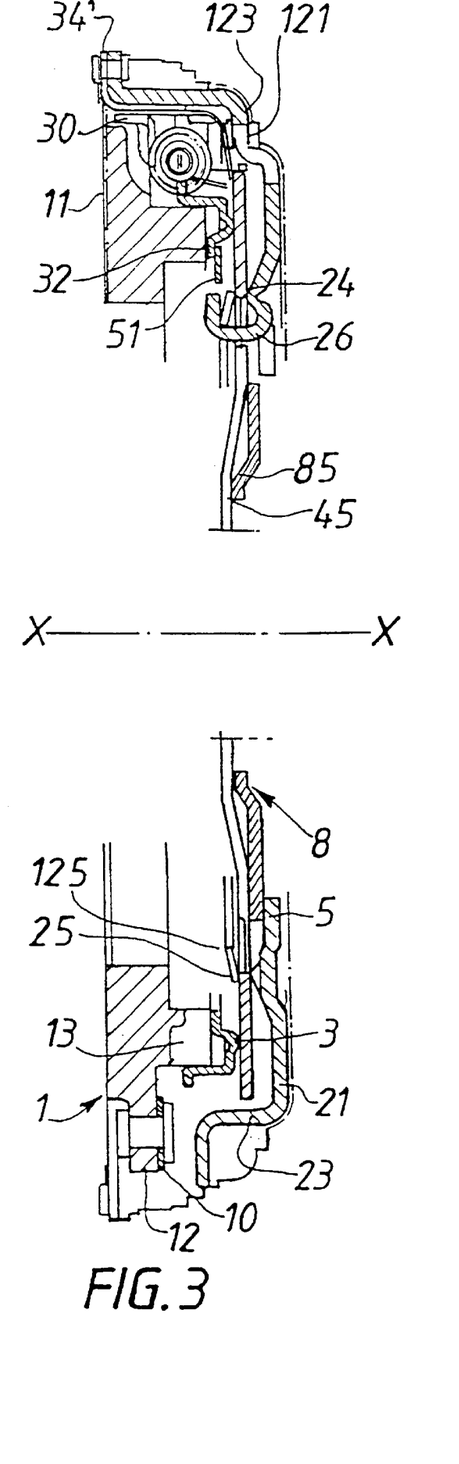
FIG. 3 is a view in cross section on the line A—A in FIG. 1.
Figure 4:
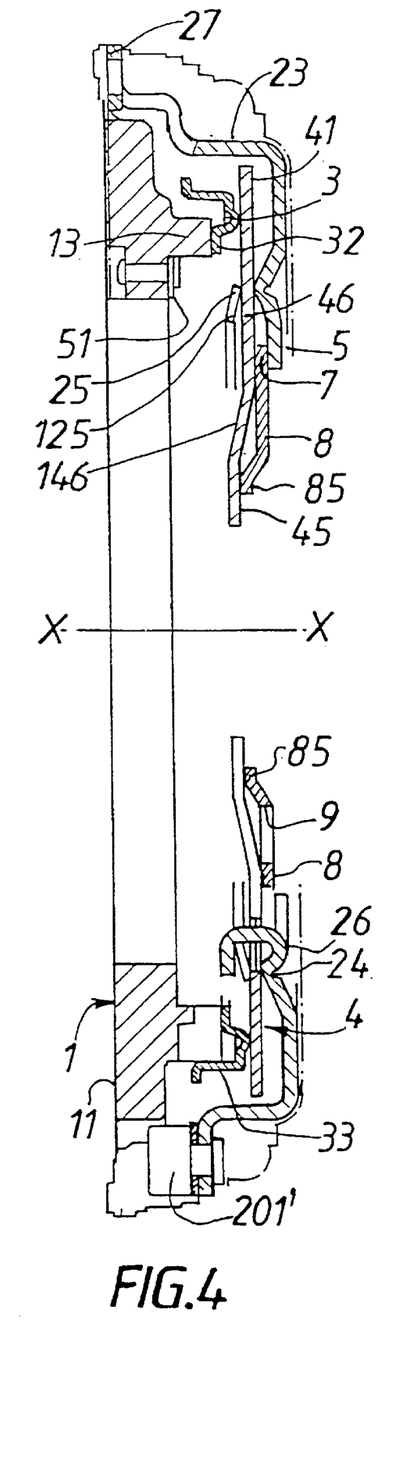
FIG. 4 is a view in cross section on the line B—B in FIG. 1.

In all cases, the cover plate 2 carries declutching levers 42 which are mounted pivotally or tiltingly on the cover plate 2, and the clutch engaging means may include two Belleville rings which are mounted in series as in the document DE-A-4 326 501, or a diaphragm mounted in series with an assistance ring as described in the document FR-A-97 11058 of Sep. 5, 1997, which discloses in addition a wear compensating device with a ratchet wheel and a worm and a set of teeth, of the same type as in the embodiment of FIG. 1 of the present invention.

Numerous clutches having a cover plate with abutment lugs, which may constitute fastening lugs, are manufactured at the present time.

The present invention takes advantage of this type of cover plate to insert a locating element between the abutment lugs and the declutching levers, in order to enable the motor manufacturer or garage proprietor to deliver a new or reconditioned clutch mechanism in a "selling position" in which the pressure plate is closer to the base 21 of the cover plate 2 than it is when in a storage position, where the declutching levers are in engagement on the abutment lugs.

According to the invention, a mechanism of the type described above is characterised in that a support member 8 carries at its outer periphery locating lugs 7 projecting radially outwards, in that the support member 8 is in contact with at least a plurality of the declutching levers 42, while the locating lugs 7 are in contact with the face of the abutment lugs 5 facing towards the declutching levers 42, in such a way that the locating lugs 7 and the support member 8 are inserted axially between the declutching levers 42 and the abutment lugs 5 by a bayonet type connection.

In the drawings the support member 8 is annular and has means 9 for engaging with a tool for turning the support member.

The means 9 consist in this example of holes. The ring 8 constituting the support member extends radially inward of the abutment lugs 5 and radially outward of the inner periphery of the fingers 42 of the diaphragm, close to the said inner periphery.

In this example the ring is closed, being in contact with all the fingers of the diaphragm 4. The ring 8 has a large height so that it constitutes a circular plate open at the centre.

Thus, the lugs 8 are introduced initially into a slot 8 which separates two consecutive abutment lugs 5. By applying a force on the ring 8, the fingers of the diaphragm 4 are displaced. Then, with the aid of a tool, the ring 8 is turned so as to bring the locating lugs 7 under the abutment lugs 5, and the load exerted on the ring 8 is afterwards released. The locating lugs 7 in this example are circumferentially narrower than the trapezoidal abutment lugs 5. More precisely, the locating lugs 7 in this example are generally rectangular in form with rounded edges. The circumferential length of the lug 7, which is longer in the circumferential direction than it is deep, is generally equal to the circumferential length of the inner periphery of the abutment lug 5. The lugs 7 are disposed radially inwardly of the fastening lugs 26. In another version, the lugs 7 may have some other form, being for example trapezoidal, triangular, semicircular or square.

The tool for turning the ring 8 has pegs engaged in the holes 9.

The ring 8 may of course be open and therefore will not come into contact with all of the fingers 42 of the diaphragm. In this case it has the form of a circular arch.

The number of locating lugs 7 depends on the application. In the present case, one locating lug 7 is provided for each abutment lug. The number of locating lugs 7 can of course be smaller than the number of abutment lugs 8.

It is preferred to have at least two locating lugs in diametrically opposed positions.

The holes 9 may of course be replaced by slots or lugs formed at the inner periphery of the ring 8.

In all the Figures, the central portion of the base 21 of the cover plate has the same form, and an arrow is shown which indicates the direction of rotation of the ring 8 when it is being removed.

In this example the ring 8 is integral with the lugs 7 and is a metal pressing.

This ring may be given a coating with a low coefficient of friction, in the region of that portion of it which is intended to come into contact with the fingers 42, and in the region of the outer face of the lugs 7 which faces away from the diaphragm.

This arrangement facilitates rotation of the support member 8.

The ring 8 can of course be made of another material, for example a fibre reinforced composite material or an aluminium based material. It can then be of mouldable material.

In accordance with the invention, because of the locating means, the fastening screws of the cover plate 2 or reaction plate can be shortened, and the tongues are protected before the clutch mechanism is fastened to the reaction plate. The support member 8 with its lugs 7 constitutes a tool for mounting the clutch mechanism on the reaction plate, and this tool is taken away after the cover plate has been fixed on the said reaction plate. The reverse is possible, in such a way that it may constitute a dismantling tool enabling the friction liners to be stripped from the pressure plate 1.

In FIGS. 1 to 8, the ring 8 with its monobloc lugs permits the fitting of a cassette 30 which is part of a wear compensating device that, in use, enables wear which is due mainly to the friction liners of the friction disc to be compensated for. The cassette 30 is mounted on the cover plate 2 before the pressure plate 1 is fixed to the cover plate.

More precisely, the diaphragm 4 is first fixed on the cover plate 1 with the aid of the fastening lugs 26 as described above, the diaphragm 4 being mounted for tilting movement between the two abutments 24, 25. The ring 8 with its lugs 7 is then mounted in the way already described between the abutment lugs 5 and the inner periphery of the fingers 42 of the diaphragm 4. The diaphragm then occupies a flat position corresponding to that which it occupies once the clutch mechanism has been fitted on the cover plate 2.

Figure 7:
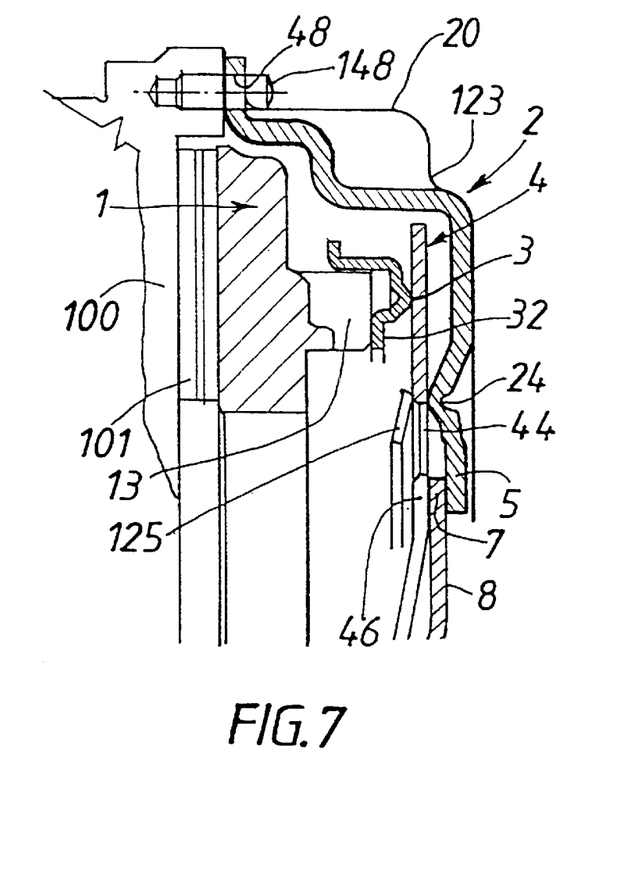
FIG. 7 is a view in cross section on the line E—E in FIG. 1.

In this position the clutch is engaged. FIG. 7 shows the reaction plate diagrammatically at 100, and at 101 the friction disc, and more precisely the friction liners of the latter.

The wear compensating device maintains the diaphragm in this position, which corresponds to the engaged position of the clutch when new. The cassette 30 is subsequently fixed, and a prebalancing operation is carried out.

The pressure plate 1, which in this example carries the means having ramps 32, and which is therefore of variable thickness, is offered up as will be described below.

Then, the pressure plate 1 is mounted on the cover plate 2. More precisely, the plate 1 being equipped with the tongues 10, the other ends of the tongues 10 are fixed to the cover plate 20.

Finally, a final operation is carried out.

In the present example, the cassette 30 is mounted in a housing 20 which is formed, in this example by pressforming, in a thickened portion of the cover plate 2, in the region of its fastening flange 22. The housing 20 intersects the flange 22 and the skirt portion 23 of the plate, which is thereby superelevated to the level of the housings 20.

The base of the housing 20 consists of a zone 1 23 joining the skirt portion 23 to the base portion 21 of the cover plate. A window 1 21 is formed in the said zone 123.

The number of tongues 10 depends on the application. In this example, two sets of tongues 10, which may be superimposed on each other, are provided, together with three housings 20. The housings 20 and the tongues 10, are spaced apart circumferentially, and alternately, at regular intervals.

Only one of the housings 20 is provided with a window 121, namely the one that serves to contain the cassette 30.

Figure 5:
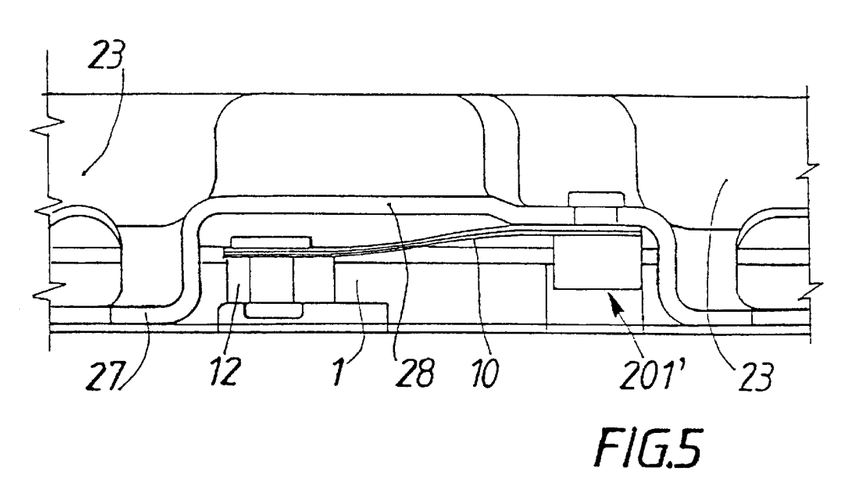
FIGS. 5, 6 are views in the direction of the arrows C and D respectively in FIG. 1.
Figure 6:
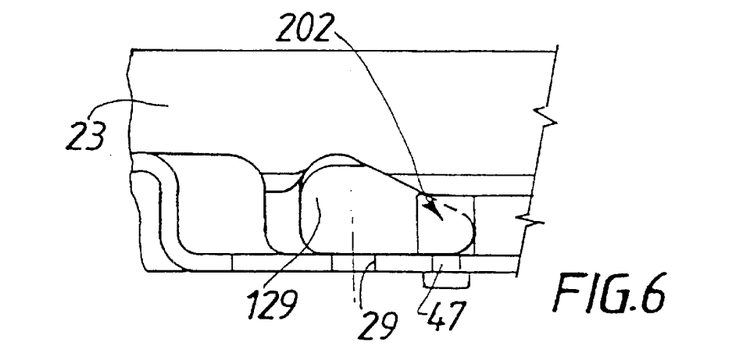

The cassette 30, which will be described below, creates an imbalance. For this reason, before the pressure plate 1 is fitted, a prebalancing operation is carried out with the aid of prebalancing rivets 201 which are mounted on the unperforated base portions 121 of the housings 20. Three rivets 201 are provided for each housing 20, not affected by the mounting of the cassette. A further prebalancing rivet 201' is arranged diametrically opposite to the cassette 30. This rivet 201' serves for the fastening of a set of tongues 10 to the cover plate 2, as can be seen in FIG. 5. The pressure plate 1 is relieved locally in the region of the rivet 201'. All of this is due to the face that the pressure plate is relieved in the region of the cassette 30 so as to provide clearance.

Finally, balancing rivets 202 are placed in the desired position so as to balance the clutch mechanism.

For this purpose, the flange 22 is formed in advance with balancing holes 47 for fitting the balancing rivet or rivets 202. For this purpose, numerous holes 47 have to be provided for locating the rivets 202.

The flange 22 also has, firstly, fastening holes 29 for passage of the fastening members—such as screws or rivets—through them for fastening the flange 22 to the reaction plate, and secondly, centring holes 48 for the passage of centring pins 148 (FIG. 4), carried by the cover plate, through them.

Apertures 129 are formed in the skirt 23, in the region of the fastening holes 29, in the present case for passage through them of the heads of screws for fastening the cover plate 2 to the reaction plate.

The apertures 129 have an asymmetrical form. More precisely, FIG. 1 shows in broken lines the outline of a head of a fastening screw and of a balancing rivet 202. The fastening holes 29 and the balancing holes 47 are close to each other. One pair of holes 29, 47 is provided for each aperture 129, thus enabling the engagement surface of the flange 22, for the heads of the fastening screws, to be increased at this region. The aperture 129 is accordingly elongated in the circumferential direction and is deeper in the region of the hole 29; each of the holes 29, 47 is located at the circumferential end of an aperture 129.

Each balancing rivet 202 is fixed, like the fastening screws, in the region of a widened zone 122 of the flange 22 which is formed at the aperture 129.

The rivet 202 does not extend beyond the zone 122, while the heads of the fastening screws do extend beyond the zones 122. Additional apertures 203 are provided in the flange 22 outside the housings 20.

Thus the flange 22 has three fastening zones 27 for contact with the reaction plate 200, which is here of slightly hollow form as can be seen in FIG. 7. These zones 27 (FIG. 5) are arranged alternately, in the circumferential sense, with the zones 28, which are offset axially with respect to the zones 27 towards the base portion 21 of the cover plate 2, for the tongues 10 to be fastened, in the present case by riveting, to the cover plate. The skirt 23 is therefore open at this level, which enables the fastening lugs 12 of the pressure plate 1, projecting radially at its outer periphery, to pass through. The zones 27, serving for fastening the cover plate 2, are longer than the zones 28 for fastening the tongues, which are joined continuously to the zones 27 so as to form a louvre (FIG. 5).

The housings 20 are central in the zones 27, which are narrower at this point. Each end of a zone 27 has a widened zone 122 and an aperture 129.

The holes 29, 47 are therefore disposed, as are the zones 122, on either side of a housing 20 at the ends of a zone.

This enables the clutch mechanism to be well balanced. This is especially so as, FIG. 3, the pressure plate is relieved so as to provide clearance for the cassette 30. The said cassette 30 includes a U-shaped support member 34 with a spine which lies in contact with the deformation of the skirt 23 that defines the summit of the housing 20, and two wing portions are pierced by the passage for a spindle 35, to which is fixed a worm 36 and which is monobloc with a ratchet wheel 37, all interposed between the two wing portions of the support member 34. The worm 36 is adjacent to one of the wing portions, while a helical take-up spring 38 is interposed between the ratchet wheel and the other wing portion.

The spindle 35 is fitted, being for example force-fitted, into the worm 36 and the wheel 37.

Figure 8:
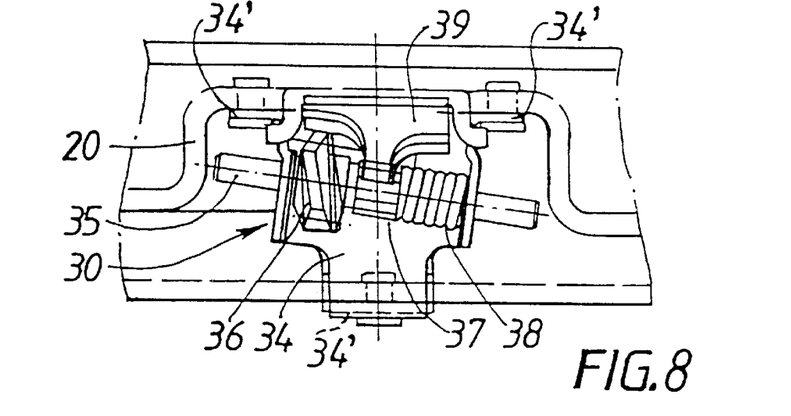
FIG. 8 is a view in the direction of the arrow F in FIG. 1.

A resilient member 39 is mounted in contact with the internal face of the spine of the support member and the worm 36, and between the other wing portion of the support member and the spring 38 (FIG. 8).

The resilient member 39, which is thinner than the support member 34 and is of metal, has an oblique flange extended by a return carrying a control tongue which is in cooperation with the teeth of the ratchet wheel 37, and with an actuator constituted by an external appendix of the Belleville ring 41 of the diaphragm. A non-return catch is press-formed in the oblique flange for cooperation with the teeth of the ratchet wheel. The catch and the control tongue can be seen in FIG. 3, but do not have any reference signs. The return carrying the control tongue is non-symmetrical in form, because the spindle 35 is inclined.

The support member 34 has three fastening lugs 34' for fastening it by riveting to the flange 22 and to the zone 123, and therefore the cover plate, respectively.

The worm 36 is disposed tangentially with respect to a set of teeth 31 which extend radially outwards away from the axial symmetry X-X of the clutch mechanism and of the clutch.

The set of teeth 31 is joined to an axially oriented annular flange 33 which is in intimate contact through its inner periphery with the outer periphery of a thickened portion divided into pads 13, which project axially from the back of the pressure plate. The flange 33 is joined to a divided annular boss. This boss constitutes the means 3 for engagement with the outer periphery of the Belleville ring 41 of the diaphragm.

Radially inward of the boss 3, ramps 32 are provided for cooperating with the transverse end face, which is preferably chamfered, of the pads 13 which act as counter ramps. Thus when wear takes place, the diaphragm acts through its external actuator on the control tongue so as to rotate the ratchet wheel during the operation of re-engagement of the clutch, whereby to arm the spring 38, with the non-return catch preventing any reverse rotation of the wheel 37 and therefore of the worm 36, and this can drive the set of teeth 31 but not vice versa. When the spring 38 is sufficiently armed, the worm 36 can drive the set of teeth 31 in rotation so as to rotate the ramp 32, thereby increasing the thickness of the pressure plate so as to compensate for the wear in the liners of the friction disc, in order that the diaphragm shall occupy the same position.

For more detail, reference is made to the Application FR-A-9 611 397 of Sep. 17, 1995, the contents of which are considered as being annexed to the present invention.

The locating means 7, 8 in accordance with the invention thus prevents any deterioration of the cassette 30, and more precisely of its resilient member 39 and its control tongue.

It will be noted that the fingers 42 have an inner end 45 which is offset axially with respect to the root zone 46 of the fingers 42 of the Belleville ring 41. This zone 46 is in the plane of the ring 41, and includes the apertures 44. It is joined through an oblique portion 146 to the inner end 45, offset axially away from the base 21 of the cover plate.

The ring 8 has at its inner periphery a bead 85 which is directed axially away from the base 21 of the cover plate 2, so as to make local contact with the inner end 45. The lugs 7 are in the plane of the ring 8.

Thus, the lugs 7 bear against the inner face, directed towards the fingers 42, of the abutment lugs 5, while the bead 85 is in contact with the outer face of the inner end 45 of the diaphragm.

The locating means 7, 8 does not then project axially with respect to the base 21 of the cover plate, and the pressure plate is recessed, so that the clutch mechanism is smaller in the axial sense.

After the cover plate 2 has been secured by screwing to the reaction plate 100, a force is applied on the ring 8 as for declutching, and the ring is turned in accordance with the arrow in FIG. 1 so as to dismount the locating means 7, 8.

It will be noted that a tongue 51 is secured by riveting to the inner periphery of the pressure plate. This tongue 51 extends tangentially with respect to a circumference of the assembly, and has a radial projecting element 52 for cooperation with one of the ramps 32. The tongue 51 thus lies mostly under the ramp.

Thus, the single member 31, 33, 3, 32, which is a press-formed metal annular ring, is pinched in the region of a ramp 32, and more precisely in the region of the ramp 32 which faces the cassette 30, between the tongue 51, which in this example is elastic in the axial direction, and the appropriate pad 13.

Thus, when axial vibration is produced by the crankshaft of the engine, or during an over-travel of the diaphragm during the declutching operation, the ramps do not rotate, and no wear compensation is produced.

The pressure plate 1 thus carries the hollow annular ring 31, 32, 33, 3—constituting ramp means—and has a variable thickness between its friction face 11 and the engagement means 3 so as to compensate for wear in the friction liners.

In another version, the ramp means are constituted by the back face of the primary abutment, in contact with the counter ramp formed in the base of the cover plate, as described in the document FR-A-2 684 151, the content of which is considered as being annexed to the present invention.

By interleaving the locating means with the support member 8 and locating lugs 7 in accordance with the invention between the abutment lugs formed at the inner periphery of the base of the cover plate and the inner periphery of the fingers of the diaphragm, the wear detection spring, carrying the secondary abutment, is controlled during assembly.

Figure 9:
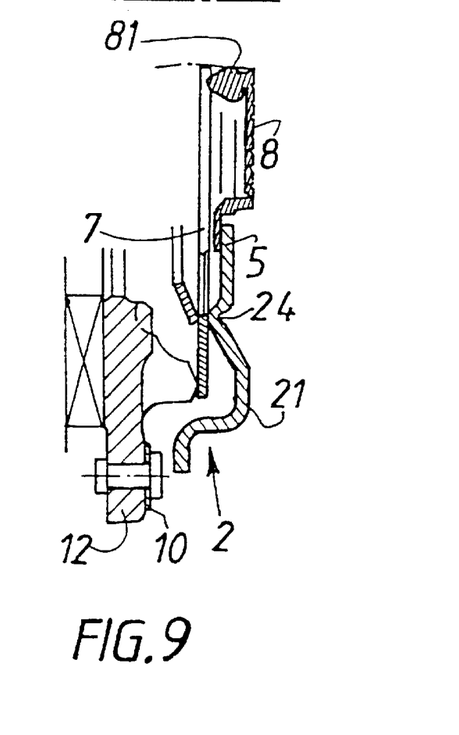
FIG. 9 is a view similar to FIG. 3 for a second embodiment.

The clutch mechanism can of course be made so as not to include the wear compensating device (FIG. 9). The diaphragm 4 is then flat, and the locating lugs 7 are offset axially towards the fingers 42 with respect to the support ring 8 of the lugs 7, monobloc with the said lugs. The lug 8 has at its inner periphery an axially oriented flange 81 for making local contact with the inner periphery of the diaphragm.

It will be noted that the locating lugs 7 are in contact with the inner face of the abutment lugs 5, and that there is an axial clearance, as in FIGS. 1 to 8, between the lugs and the fingers 42.

In all cases, the locating lugs 7 are offset axially with respect to the inner periphery of the support member 8, which is formed by the flange 81 or the bead 85.

The ring 8 may of course be equipped with gripping means for rotating it with the aid of a tool, so as to bring the locating lugs under the abutment lugs.

The ring 8 may, in the manner of a control knob, be provided with a small bar projecting away from the diaphragm. The means 9 can then consist of projecting elements. In general terms, the circumferential length of a locating lug 7 is shorter than the circumferential length between two consecutive abutment lugs 5, in order that the lugs 7 can be introduced into the slots 6 so as to provide the bayonet connection.

Apertures can be formed between two consecutive fingers 42 constituting declutching levers for passage of one or more tools, to give access to screws fastening the reaction plate to the crankshaft of the engine of the vehicle. In that case, the holes 9 of FIGS. 1 to 8 are in facing relationship with the said apertures for dismantling the reaction plate, which is fixed directly or indirectly, for example through an interposed radial flange or a mass, to the crankshaft.

As mentioned above, the clutch engaging means may include one or more Belleville rings connected in series, and the declutching means may be separate from the clutch engaging means.

The tongues 10 may be oriented radially.

In all cases the tongues constitute the means for coupling the pressure plate and the cover plate in rotation, while enabling the pressure plate to move axially with respect to the cover plate.

The abutment lugs, directed radially inwardly, that is to say towards the axis X-X, may also be fastening lugs; the locating lugs 7 then pass under the fastening means carried by the abutment lugs while the bayonet connection is being made.

The axial offset of the locating lugs with respect to the inner periphery of the support member facilitates assembly and creates a clearance between the locating lugs and the bayonet type declutching levers.

The declutching levers 42 are in all cases in contact with the clutch engaging means, in direct contact with the engagement means 3 or in indirect contact on the abutment means 3 through the declutching levers. The declutching levers act at will on the clutch engaging means.

In another version, the clutch engaging means may consist of a plurality of coil springs bearing on a false diaphragm and on the cover plate.

The locating lugs 7 can of course be attached to the fastening on the support member, for example by riveting, welding etc.

The engagement means 3 may be movable with respect to the pressure plate as in FIGS. 1 to 8, so as to vary the thickness of the pressure plate through the ramps 32 and counter ramps 13, or they may be monobloc with the pressure plate (FIG. 9).

The cassette 30 may of course be in some other form, for example that which is described in the document PCT/FR99/00261 applied for on Feb. 5, 1998.

Thus, in the light of the Application PCT/FR99/00261, the resilient member may constitute by itself the support for the cassette. The take-up spring may be disposed outside the cassette, being for example located between a pad and a ramp. In that case, the housing of the cover plate may constitute the support for the cassette.

The flange 33 may of course be coupled in rotation to an intermediate member carrying the set of teeth 31 and located axially on the cover plate, by means for example of extension elements projecting from two superimposed tongues 10. A connection is arranged between the intermediate member and the ring 200, so as to permit axial movement of the pressure plate with respect to the intermediate member while coupling the said intermediate member in rotation to the ring 200. Such an arrangement is described in the document FR 98 11991, applied for on Sep. 23, 1998, to which reference should be made for more detail.

The braking means comprising the tongue 51 may of course be replaced by a braking ring, for example, interposed between the ring 200 and the pressure plate. For more details, reference should be made for example to the document FR 98 14448 applied for on Nov. 17, 1998.

What is claimed is:

1. A clutch mechanism including a cover plate (2) having a transversely oriented base portion (21) formed with a hole in the centre and provided at its inner periphery with abutment lugs (5) directed radially inwards, a pressure plate (1) having a front friction face (11) and carrying dorsal engagement means (3), means (10) for coupling the pressure plate (1) in rotation to the cover plate (2) while enabling the pressure plate (1) to move axially with respect to the cover plate (2), clutch engaging means (41) bearing on the cover plate (2) for acting on the engagement means (3), and declutching levers (42) mounted pivotally on the cover plate (2) for acting on the clutch engaging means, characterised in that a support member (8) carries at its outer periphery locating lugs (7) which project radially outwards, in that the support member (8) is in contact with at least a plurality of the declutching levers (42), while the locating lugs (7) are in contact with the face of at least some of the abutment lugs (5) facing towards the declutching levers (42), so that the locating lugs and the support member are inserted axially between the declutching levers and the abutment lugs by a connection of the bayonet type.

2. A mechanism according to claim 1, characterised in that the locating lugs (7) are offset axially with respect to the inner periphery of the support member (8).

3. A mechanism according to claim 2, characterised in that the support member has at its inner periphery a bead (85) extending in the opposite direction from the base portion (21) of the cover plate (2), for contact with the inner ends of at least some of the declutching levers (42).

4. A mechanism according to claim 3, characterised in that the inner end (45) of a declutching lever (42) is offset axially in the opposite direction from the base portion (21) of the cover plate (2).

5. A mechanism according to claim 3, characterised in that the inner periphery of the support member (8) has an axially oriented annular flange for contact with at least some of the declutching levers (42).

6. A mechanism according to claim 1, characterised in that the support member (8) has means (9) for making engagement with a tool for turning the support member (8).

7. A mechanism according to claim 6, characterised in that the said means consist of holes (9).

8. A mechanism according to claim 6, characterised in that the said means consist of a projecting element.

9. A mechanism according to claim 1, characterised in that the locating lugs (7) are monobloc with the support member (8).

10. A mechanism according to claim 1, characterised in that the support member (8) is in the form of a closed annular ring.

11. A mechanism according to claim 1, characterised in that the support member is in the form of an open ring.

12. A mechanism according to claim 1, characterised in that the clutch engaging means (41) include a Belleville ring (41) which is extended radially inwards by the declutching levers (42) so as to constitute a diaphragm (4).

13. A mechanism according to claim 12, characterised in that it includes a wear compensating device.

14. A mechanism according to claim 13, characterised in that the wear compensating device comprises a cassette (30) fixed on the cover plate (2) and including a worm (36) for acting on a set of teeth (31) fixed to the engagement means (3), which are movable with respect to the pressure plate.

* * * * *